United States Patent
Satonaka et al.

(10) Patent No.: US 8,175,838 B2
(45) Date of Patent: May 8, 2012

(54) DEVICE FOR VEHICLE RUNNING TEST

(75) Inventors: Takao Satonaka, Toyota (JP);
Yasumasa Narumi, Koshigaya (JP)

(73) Assignees: Toyota Jidosha Kabushiki Kaisha,
Toyota-shi (JP); Meidensha Corporation, Tokyo (JP)

( * ) Notice: Subject to any disclaimer, the term of this patent is extended or adjusted under 35 U.S.C. 154(b) by 465 days.

(21) Appl. No.: 12/376,578

(22) PCT Filed: Aug. 10, 2007

(86) PCT No.: PCT/JP2007/065726
§ 371 (c)(1),
(2), (4) Date: Feb. 6, 2009

(87) PCT Pub. No.: WO2008/018590
PCT Pub. Date: Feb. 14, 2008

(65) Prior Publication Data
US 2009/0319200 A1 Dec. 24, 2009

(30) Foreign Application Priority Data
Aug. 10, 2006 (JP) .................................. 2006-218623

(51) Int. Cl.
G01L 25/00 (2006.01)
(52) U.S. Cl. ............ 702/113; 702/130; 73/121; 73/862; 73/116.01; 73/117.01; 73/118.01
(58) Field of Classification Search .................. 702/113, 702/130
See application file for complete search history.

(56) References Cited

U.S. PATENT DOCUMENTS

| 4,327,578 | A | | 5/1982 | D'Angelo | |
|---|---|---|---|---|---|
| 4,455,866 | A | * | 6/1984 | Barrigar | 73/116.07 |
| 5,111,685 | A | * | 5/1992 | Langer | 73/118.01 |
| 6,360,591 | B1 | * | 3/2002 | Carley | 73/116.06 |
| 6,601,435 | B2 | * | 8/2003 | Hong | 73/9 |
| 2004/0007046 | A1 | * | 1/2004 | Karrer et al. | 73/9 |
| 2005/0234629 | A1 | * | 10/2005 | Maruki | 701/93 |

FOREIGN PATENT DOCUMENTS

| JP | 56 87838 | | 7/1981 |
|---|---|---|---|
| JP | 3 39632 | | 2/1991 |
| JP | 05118961 A | * | 5/1993 |
| JP | 6 258193 | | 9/1994 |
| JP | 06249754 A | * | 9/1994 |

(Continued)

*Primary Examiner* — Drew A Dunn
*Assistant Examiner* — Timothy H Hwang
(74) *Attorney, Agent, or Firm* — Oblon, Spivak, McClelland, Maier & Neustadt, L.L.P.

(57) ABSTRACT

In a running test, vehicle wheels are mounted on rollers. Each roller receives torque corresponding to the running resistance, which is a value corresponding to the running resistance applied to the vehicle on actual ground. The actual friction coefficient between the wheels and the rollers is calculated. The running resistance is corrected such that the actual friction coefficient becomes equal to the friction coefficient on actual ground that is calculated based on the slip ratio of the wheels with respect to the rollers. This approximates the running resistance applied to the vehicle by the rollers to the running resistance applied to the vehicle on actual ground as the torque is applied to the rollers in correspondence with the corrected running resistance. This prevents the drive force produced by the vehicle in the running test from becoming different than the drive force that is produced when running on actual ground.

13 Claims, 5 Drawing Sheets

FOREIGN PATENT DOCUMENTS

| JP | 06258193 A | * | 9/1994 |
| JP | 11 2588 | | 1/1999 |
| JP | 2000 346752 | | 12/2000 |
| JP | 2002 174566 | | 6/2002 |
| JP | 2002174566 A | * | 6/2002 |
| JP | 2004 20401 | | 1/2004 |

* cited by examiner

DEVICE FOR VEHICLE RUNNING TEST

FIELD OF THE INVENTION

The present invention relates to a device for a vehicle running test.

BACKGROUND OF THE INVENTION

Conventionally, a vehicle running test device that simulates a running state of a vehicle, such as an automobile, running on the actual ground is used to evaluate running performance, fuel consumption performance, and exhaust characteristics of the vehicle.

The vehicle running test device includes columnar rollers and chains. Each roller has an outer circumferential surface on which a wheel of a vehicle is mounted and is rotated as the wheel rotates. The chains are connected to the vehicle and restrict displacement of the vehicle from the rollers by pulling the vehicle toward the rollers. The vehicle running test device calculates running resistance of the vehicle on the actual ground using the speed of the vehicle running on the rollers, which is obtained based on rotation of the rollers. The device then applies torque corresponding to the running resistance to the rollers. As the vehicle runs on the rollers in accordance with a prescribed running pattern, the torque, which acts on the rollers in correspondence with the running resistance, changes in correspondence with change of the running resistance applied to the vehicle when the vehicle runs on the actual ground in accordance with the running pattern.

A running test of a vehicle, which is carried out to, for example, evaluate the fuel consumption performance of the vehicle, is performed in the following manner. A vehicle is first mounted on rollers of a vehicle running test device. Chains are then attached to the vehicle to stop the vehicle from displacing from the rollers. In this state, the vehicle is caused to run in accordance with a running pattern prescribed to evaluate the fuel consumption performance of the vehicle, which is, for example, the Japanese 10-15 mode cycle. Meanwhile, the rollers of the test device receive torque corresponding to the running resistance applied to the vehicle when the vehicle runs in accordance with the Japanese 10-15 mode cycle. Then, the fuel consumption of the vehicle running in the Japanese 10-15 mode cycle is measured. The fuel consumption performance of the vehicle is thus evaluated based on the measured values.

Specifically, when the vehicle runs on the actual ground, the running resistance increases as the running speed of the vehicle increases. However, the running resistance applied to the vehicle when the vehicle runs on the actual ground is also influenced by the friction coefficient between the wheels of the vehicle and the ground surface, in addition to the vehicle running speed. Thus, in the technique described in Patent Document 1, in order to apply the torque corresponding to the running resistance on the actual ground to the rollers, the running resistance is calculated with not only the vehicle running speed but also the friction coefficient between the wheels and the ground surface taken into consideration. Such calculation increases the accuracy of the obtained running resistance.

More specifically, the relationship between the slip ratio of each wheel with respect to the surface of the actual ground surface and the friction coefficient μj between the wheel and the actual ground surface is defined in advance using a map or a model expression. Then, the slip ratio of the wheel with respect to the roller of the vehicle running test device is determined. Based on the slip ratio, the friction coefficient μj is calculated using the map or the model expression. Further, the running resistance applied to the vehicle on the actual ground is calculated with the friction coefficient μj taken into consideration. The torque corresponding to the calculated running resistance is then applied to the roller.

However, in the running test of the vehicle using the test device, the drive force produced by the vehicle is different from the drive force generated by the vehicle running on the actual ground. As has been discovered, such difference in drive force decreases the accuracy of the test result.

Specifically, the contact state of each wheel with respect to the roller of the test device is different from the contact state of the wheel with respect to the actual ground. As a result, the running resistance applied to the vehicle by the roller becomes different from the running resistance applied to the vehicle running on the actual ground. Such difference results in the difference between the drive force produced by the vehicle in the test and the drive force generated by the vehicle on the actual ground.

Further, the difference in the drive force between the vehicle in the test and the vehicle on the actual ground may be brought about also by the chains pulling the vehicle toward the rollers to restrict displacement of the vehicle from the rollers. That is, as the vehicle is pulled toward the rollers by the chains, the load applied to each roller by the corresponding wheel increases compared to the load applied to the actual ground by the wheel. Thus, when the torque corresponding to the running resistance is applied to each roller, the running resistance applied to the vehicle by the roller increases by an amount corresponding to the aforementioned increase amount of the load. As a result, the drive force produced by the vehicle in the running test, which runs in the running pattern such as the Japanese 10-15 mode cycle, becomes greater than the drive force generated by the vehicle when the vehicle runs on the actual ground.

Patent Document 1: Japanese Laid-Open Patent Publication No. 2004-20401

SUMMARY OF THE INVENTION

Accordingly, it is an objective of the present invention to provide a vehicle running test device that prevents the drive force produced by a vehicle when the vehicle runs in the test from becoming different from the drive force generated by the vehicle when the vehicle runs on the actual ground and thus improves accuracy of the result of the test.

To achieve the foregoing objective and in accordance with one aspect of the present invention, a vehicle running test device including a roller, a running resistance calculating section, and a running resistance applying section is provided. A wheel of a vehicle is mounted on the roller. The roller is rotated by rotation of the wheel. The running resistance calculating section calculates a running resistance of the vehicle on an actual ground based on a vehicle speed determined based on rotation of the roller. The running resistance applying section applies a torque corresponding to the running resistance to the roller. Based on a slip ratio of the wheel with respect to the roller, the vehicle running test device calculates a friction coefficient between the wheel and a ground surface of the actual ground, and reflects the friction coefficient on the running resistance calculated by the running resistance calculating section. The vehicle running test device includes a correcting section that calculates a friction coefficient between the wheel and the roller and corrects the running resistance calculated by the running resistance calculating section in such a manner that the friction coefficient on the roller becomes equal to the friction coefficient on the actual ground.

DETAILED DESCRIPTION OF THE PREFERRED EMBODIMENT

A vehicle running test device according to one embodiment of the present invention will now be described with reference to FIGS. 1 to 6. The vehicle running test device is used in a running test of an automobile 1 to evaluate the running performance, the fuel consumption performance, and the exhaust characteristics of the vehicle 1.

Figure 1:
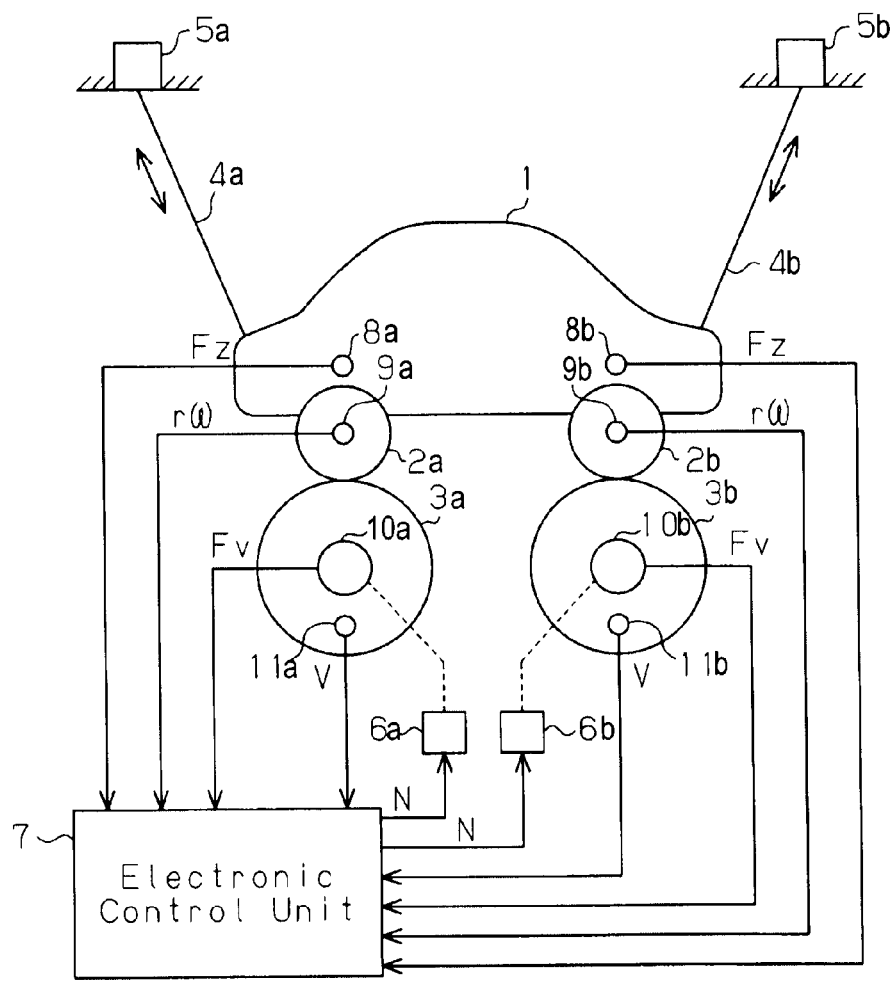
FIG. 1 is a diagram showing a vehicle running test device, as a whole, according to one embodiment of the present invention.
Figure 2:
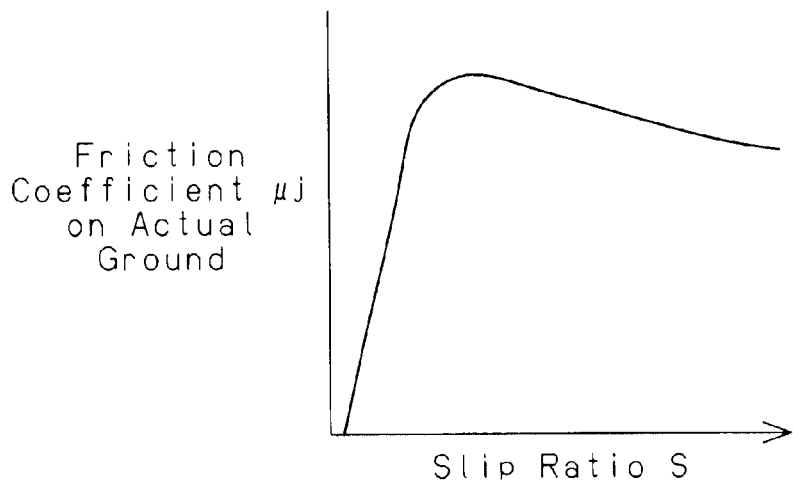
FIG. 2 is a graph representing changes of the friction coefficient with respect to changes of the slip ratio of a wheel running on the actual ground.

As shown in FIG. 1, the vehicle running test device includes rollers 3a and 3b, a pair of front and rear chains 4a and 4b, and adjustment devices 5a and 5b. For the sake of simplicity, throughout the specification hereafter, the reference numerals "3", "4", and "5" are used to refer to either the front or rear element (or pair of elements) of the respective corresponding features associated with the reference numbers (3a and 3b), (4a and 4b), and (5a and 5b). Each of the rollers 3 has an outer circumferential surface on which a corresponding one of the pair of front wheels 2a and the pair of rear wheels 2b of the vehicle 1 is mounted. For the sake of simplicity, throughout the specification hereafter, the reference numeral "2" is used to refer to any of the front or rear wheels of the respective corresponding features associated with the reference numbers (2a) and (2b). The rollers 3 are rotated by rotation of the wheels 2. The chains 4 restrict displacement of the vehicle 1 from the rollers 3. The adjustment devices 5 each adjust the tensile force produced by the corresponding one of the chains 4. The four rollers 3 are provided in correspondence with the four wheels 2. The pair of front rollers 3 corresponding to the front wheels 2 are connected to each other in an integrally rotatable state. The pair of rear rollers 3 corresponding to the rear wheels 2 are connected to each other in an integrally rotatable state. A load motor (a running resistance applying section) 6a and 6b (where 6a represents the pair of load motors in the front and 6b represents the pair of load motors in the rear) is connected to each of the front and rear rollers 3 to apply torque to the rollers 3. For the sake of simplicity, throughout the specification hereafter, the reference numeral "6" is used to refer to any of the front or rear load motors of the respective corresponding features associated with the reference numbers (6a) and (6b). The applied torque corresponds to running resistance of the vehicle 1. An end of each of the chains 4 is connected to the vehicle 1 mounted on the rollers 3. The other end of each chain 4 is connected to the corresponding adjustment device 5, which is arranged upward from the vehicle 1.

The vehicle running test device includes an electronic control unit 7 that controls the device to simulate a running state of the vehicle 1 running on the actual ground in various types of running tests.

The electronic control unit 7 receives detection signals from a pair of load sensors 8a and 8b each detecting load applied to the rollers 3 by the corresponding wheels 2, detection signal from a pair of wheel speed sensors 9a and 9b each detecting the rotational speed of the corresponding wheels 2, detection signals from a pair of drive force sensors 10a and 10b each detecting drive force transmitted from the corresponding wheels 2 to the rollers 3, and detection signals from a pair of roller speed sensors 11a and 11b detecting the rotational speed of the corresponding rollers 3. For the sake of simplicity, throughout the specification hereafter, the reference numerals "8", "9", "10", and "11" are used to refer to either the front or rear element (or pair of elements) of the respective corresponding features associated with the reference numbers (8a and 8b), (9a and 9b), (10a and 10b), and (11a and 11b).

The vehicle running test device of FIG. 1 is used to test a four-wheel-drive vehicle. Thus, the two load sensors 8 are provided at a front position and a rear position in correspondence with the front rollers 3 and the rear rollers 3. In the same manner, the wheel speed sensors 9, the drive force sensors 10, and the roller speed sensors 11 are located at front positions and rear positions in correspondence with the front rollers 3 and the rear rollers 3. However, if the four rollers 3 of the test device for the four-wheel-drive vehicle are provided independently from one another, four load motors 6, four load sensors 8, four wheel speed sensors 9, four drive force sensors 10, and four roller speed sensors 11 are arranged in correspondence with the four rollers 3. In the case of a test device for a two-wheel-drive vehicle, the numbers of the rollers 3, the load motors 6, the load sensors 8, the wheel speed sensors 9, the drive force sensors 10, and the roller speed sensors 11 are each reduced to the half of the corresponding number in the test device for the four-wheel-drive vehicle. In other words, the rollers 3, the load motors 6, the load sensors 8, the wheel speed sensors 9, the drive force sensors 10, and the roller speed sensors 11 are provided only for the drive wheels of the two-wheel-drive vehicle.

The vehicle speed V of the vehicle 1 running on the rollers 3 is determined from the rotational speed of the rollers 3. In correspondence with the vehicle running speed V, the electronic control unit 7 calculates the running resistance N applied to the vehicle 1 on the actual ground at the vehicle running speed V. The electronic control unit 7 thus controls the load motors 6 in such a manner as to apply torque corresponding to the running resistance Nt of the rollers 3. Thus, as the vehicle 1 is caused to run on the rollers 3 in accordance with a prescribed running pattern, the torque, which acts on the rollers 3 by the extent corresponding to the running resistance N of the vehicle 1 running on the actual ground, changes in correspondence with changes of the running resistance N of the vehicle 1 when the vehicle 1 runs on the actual ground in the running pattern.

A procedure for carrying out the running test of the vehicle 1 will hereafter be described in detail. In the following, a running test is performed to, by way of example, evaluate the fuel consumption performance of the vehicle 1.

To perform the running test, the wheels 2 of the vehicle 1 are mounted on the corresponding rollers 3 of the vehicle running test device. An end of each chain 4 is connected to the vehicle 1 and the other end of the chain 4 is connected to the corresponding adjustment device 5. In this state, while monitoring the load Fz applied to each roller 3 by the corresponding wheel 2, which is detected by the associated load sensor 8, the tensile force produced by each chain 4 is adjusted. In this manner, while the tensile force is adjusted to such a value that the load Fz is not influenced by the tensile force, displacement of the vehicle 1 from the rollers 3 is restricted.

Subsequently, the vehicle 1 is caused to run in a running pattern suitable for evaluating the fuel consumption performance, which is, for example, the Japanese 10-15 mode cycle. In this state, torque corresponding to the running resistance N is applied to each roller 3, so that the vehicle 1 receives a running resistance equal to the running resistance N applied to the vehicle 1 when the vehicle 1 runs on the actual ground in the running pattern. The fuel consumption of the vehicle 1 running in the Japanese 10-15 mode cycle is then measured and the fuel consumption performance of the vehicle 1 is thus evaluated using the measured values.

The magnitude of the running resistance acting on the vehicle 1 when the vehicle 1 runs on the actual ground is influenced by not only the vehicle speed V but also the friction coefficient between each wheel 2 and the ground surface. Accordingly, as has been described in "BACKGROUND ART", the running resistance N may be calculated with the vehicle speed V and the friction coefficient both taken into consideration so that the torque corresponding to the running resistance on the actual ground is applied to the rollers 3 of the vehicle 1 in the running test.

In this case, the relationship between the slip ratio of each wheel 2 with respect to the ground surface when the vehicle 1 runs on the actual ground and the friction coefficient $\mu j$ between the wheel 2 and the ground surface is defined in advance by a map or a model expression. The relationship is represented in, for example, FIG. 2. The slip ratio of each wheel 2 with respect to the corresponding roller 3 of the vehicle running test device is then determined. Based on the slip ratio, the friction coefficient $\mu j$ is calculated with reference to the map or the model expression. The running resistance N is then obtained with the friction coefficient $\mu j$ taken into consideration.

Through such calculation of the running resistance N, which uses the friction coefficient $\mu j$ between each wheel 2 and the surface of the actual ground, the obtained running resistance N becomes more accurate as the running resistance applied to the vehicle 1 when the vehicle 1 runs on the actual ground. However, even if the running resistance N is determined with the friction coefficient $\mu j$ taken into consideration and the torque corresponding to the running resistance N is applied to the rollers 3 in the running test, the drive force produced by the vehicle 1 is different from the drive force generated by the vehicle 1 running on the actual ground. This correspondingly decreases the accuracy of the result of the running test. Specifically, the contact state between each wheel 2 and the vehicle running test device (the roller 3) is different from the contact state between the wheel 2 and the actual ground surface. The running resistance applied to the vehicle 1 by the rollers 3 thus becomes different from the running resistance applied to the vehicle 1 by the actual ground surface. Accordingly, the drive force of the vehicle 1 in the running test becomes different from the drive force of the vehicle 1 on the actual ground.

More specifically, such difference between the contact state of each wheel 2 on the actual ground and the contact state of the wheel 2 on the vehicle running test device, and the corresponding difference between the drive force produced by the vehicle 1 in the running test and the drive force generated by the vehicle 1 on the actual ground, are brought about by the following reasons [1] and [2].

[1] The surface of each roller 3 on which the corresponding wheel 2 of the vehicle 1 is mounted is smoother than the surface of the actual ground. This increases the slip ratio of the wheel 2 with respect to the roller 3, which is determined in the running test, compared to the slip ratio of the wheel 2 with respect to the actual ground. Thus, the friction coefficient $\mu j$ obtained using the slip ratio becomes different from the friction coefficient $\mu j$ determined based on the slip ratio of the wheel 2 with respect to the surface of the actual ground. The running resistance N is calculated with the friction coefficient $\mu j$ based on the slip ratio of the wheel 2 with respect to the roller 3 taken into consideration. The torque corresponding to the running resistance N is then applied to the rollers 3. Thus, the running resistance applied to the vehicle 1 by the rollers 3 becomes different from the running resistance applied to the vehicle 1 running on the actual ground. As a result, the drive force produced by the vehicle 1 in the running test becomes different from the drive force generated by the vehicle 1 running on the actual ground. Specifically, if the running test is carried out in the running pattern suitable for evaluation of the fuel consumption performance, such as the Japanese 10-15 mode cycle, the drive force generated by the vehicle 1 in the running test becomes greater than the drive force produced by the vehicle 1 running on the actual ground.

[2] The portion of the outer circumferential surface of each roller 3 that contacts the corresponding wheel 2 projects toward the wheel 2 in an arcuate shape. This causes the outer circumferential surface of the roller 3 to sink into the wheel 2, increasing the contact surface area between the wheel 2 and the roller 3 compared to the contact surface area between the wheel 2 and the actual ground surface. The slip ratio of the wheel 2 with respect to the roller 3 determined in the running test thus becomes different from the slip ratio of the wheel 2 with respect to the actual ground. Accordingly, the friction coefficient $\mu j$ calculated from the slip ratio becomes different from the friction coefficient $\mu j$ that is determined based on the slip ratio of the wheel 2 with respect to the actual ground surface. The running resistance N is calculated using the friction coefficient $\mu j$ based on the slip ratio of the wheel 2 with respect to the roller 3. Torque is then applied to the rollers 3 in correspondence with such running resistance N. Thus, the running resistance applied to the vehicle 1 by the rollers 3 becomes different from the running resistance that acts on the vehicle 1 when the vehicle 1 runs on the actual ground. As a result, the drive force produced by the vehicle 1 in the running test becomes different from the drive force generated by the vehicle 1 running on the actual ground. Specifically, if the running test is performed in the running pattern suitable for evaluation of the fuel consumption performance, such as the Japanese 10-15 mode cycle, the drive force produced by the vehicle 1 in the running test becomes greater than the drive force by the vehicle 1 running on the actual ground.

Figure 3:
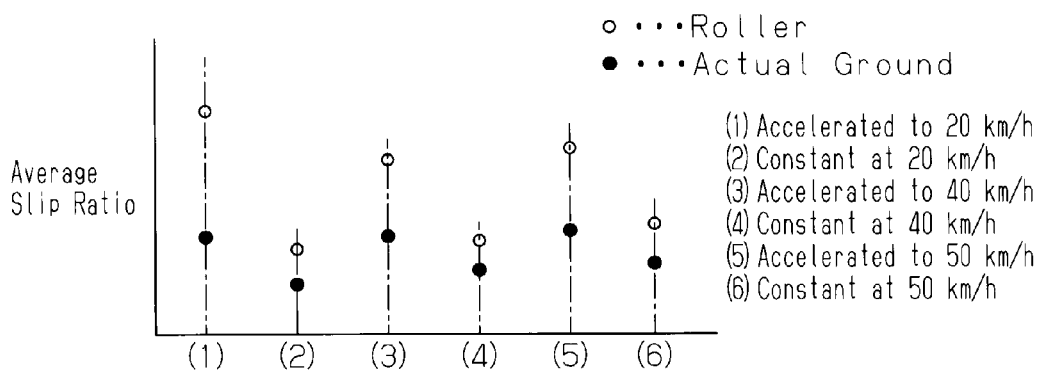
FIG. 3 is a graph representing the difference between the slip ratio of the wheel on a roller and the slip ratio of the wheel on the actual ground in accordance with various running conditions of the vehicle.

As is clear from the reasons [1] and [2], the smoothness of the surface of each roller 3 or the arcuate shape of such surface result in the difference between the slip ratio of each wheel 2 with respect to the corresponding roller 3 and the slip ratio of the wheel 2 with respect to the actual ground surface. This causes the difference between the drive force of the vehicle 1 in the running test and the drive force of the vehicle 1 on the actual ground. FIG. 3 is a graph representing the difference between the slip ratio of the wheel 2 with respect to the roller 3 and the slip ratio of the wheel 2 with respect to the actual ground in accordance with various running conditions of the vehicle 1. As is clear from the graph, the slip ratio of the wheel 2 with respect to the roller 3 is greater than the slip ratio of the wheel 2 with respect to the actual ground, regardless of the running conditions of the vehicle 1. Such difference of the slip ratios causes the difference between the drive force produced by the vehicle 1 running on the actual ground and the drive force generated by the vehicle 1 in the running test using the running test device.

Apart from the reasons [1] and [2], when the tensile force of each chain 4 acting on the corresponding roller 3 to restrict displacement of the vehicle 1 from the rollers 3 is excessively great, the tensile force can be cause of a difference between the drive force of the vehicle 1 in the running test and the drive force of the vehicle 1 on the actual ground.

Figure 4:
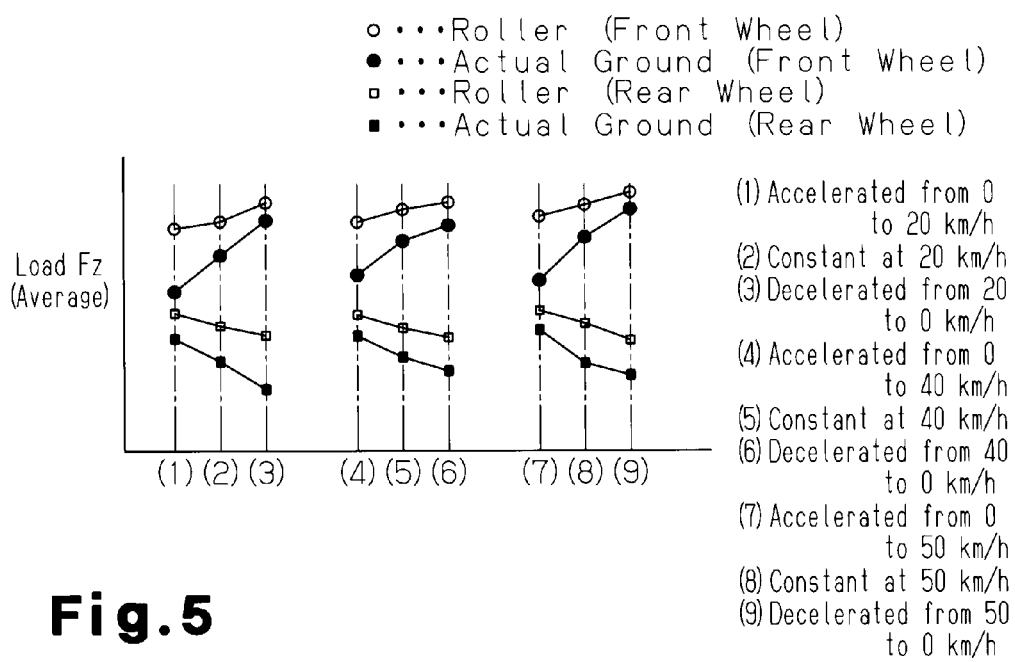
FIG. 4 is a graph representing the difference between the load applied to the roller by the wheel and the load applied to the actual ground by the wheel in various running conditions of the vehicle.
Figure 5:
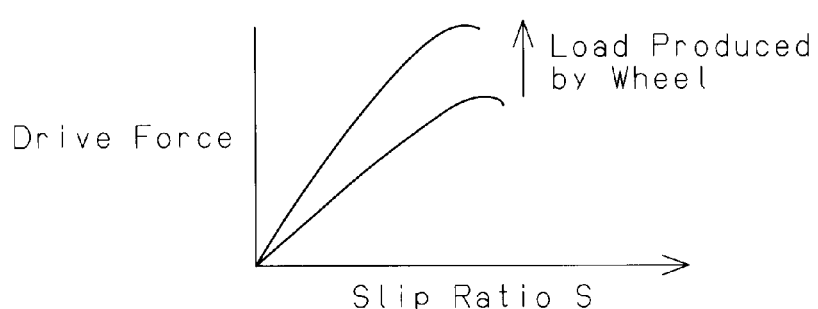
FIG. 5 is a graph representing changes of the drive force produced by the vehicle as the slip ratio of the roller and the load applied to the roller by the wheel change under the condition that the drive force of the vehicle is generated in such a manner that the drive force transmitted from the wheel to the roller is maintained constant.

If this is the case, the load Fz applied to each roller 3 by the corresponding wheel 2 becomes greater than the load applied to the surface of the actual ground by the wheel 2. Thus, when torque corresponding to the running resistance N is applied to the rollers 3, the running resistance applied to the vehicle 1 by the rollers 3 becomes greater than the running resistance applied to the vehicle 1 by the actual ground. FIG. 4 is a graph representing the difference between (the average of) the load Fz caused by each wheel 2 on the roller 3 and (the average of) the load Fz caused by the wheel 2 on the actual ground in accordance with various running conditions of the vehicle 1. As is clear from the graph, regardless of the running conditions of the vehicle, the load Fz on the rollers 3 is greater than the load Fz on the actual ground. Further, from the above-described reasons, the drive force produced by the vehicle 1 becomes greater as the load Fz applied to each wheel 2 by the corresponding roller 3 becomes greater, as illustrated in FIG. 5. As a result, if the tensile force of each chain 4 acting on the corresponding roller 3 to restrict displacement of the vehicle 1 from the rollers 3 is excessively great, the drive force produced by the vehicle 1 in the running test in accordance with the running pattern suitable for the evaluation of the fuel consumption performance, such as the Japanese 10-15 mode cycle, becomes greater than the drive force generated by the vehicle 1 running on the actual ground.

However, in the present embodiment, with displacement of the vehicle 1 from the rollers 3 restricted by the chains 4, the tensile force applied to the vehicle 1 by the chains 4 is adjusted through the adjustment devices 5 while monitoring the load Fz applied to each roller 3 by the corresponding wheel 2, which is detected by the associated load sensor 8. In this manner, the tensile force of each chain 4 acting on the vehicle 1 is adjusted to such a value that the load Fz is not influenced by the tensile force of the chain 4 before starting the running test. This prevents the drive force generated by the vehicle 1 in the running test from becoming greater than the drive force produced by the vehicle 1 running on the actual ground.

Also, in the present embodiment, in order to suppress the difference between the drive force produced by the vehicle 1 in the running test and the drive force caused by the vehicle 1 on the actual ground due to the above-described reasons [1] and [2], the running resistance N is calculated in the following manner. Specifically, the actual friction coefficient μch between each wheel 2 and the corresponding roller 3 is calculated. The running resistance N, which is determined based on the vehicle speed V, is then corrected in such a manner that the actual friction coefficient μch on the roller 3 becomes equal to the aforementioned friction coefficient μj on the actual ground. In this manner, the running resistance N is obtained with the friction coefficient μj taken into consideration.

In this case, if torque corresponding to the running resistance N is applied to each roller 3, the magnitude of the torque acting on the roller 3 changes by an amount corresponding to the aforementioned correction. This also changes the slip ratio of each wheel 2 with respect to the roller 3. The friction coefficient μj on the actual ground is then calculated using the map or the model expression, based on such slip ratio. In other words, through the above-described correction of the running resistance N, the slip ratio of each wheel 2 with respect to the corresponding roller 3 is adjusted in such a manner that the friction coefficient μj determined based on the slip ratio of the wheel 2 with respect to the roller 3 becomes equal to the friction coefficient μj obtained based on the slip ratio of the wheel 2 running on the actual ground. Further, such adjustment of the slip ratio approximates the running resistance applied to the vehicle 1 by the rollers 3 when the torque corresponding to corrected running resistance N is applied to the rollers 3 with the contact state of the wheels 2 with respect to the rollers 3 different from that on the actual ground to the running resistance acting on the vehicle 1 running on the actual ground.

As has been described, the actual friction coefficient μch between each wheel 2 and the corresponding roller 3 is determined. The calculated running resistance N is then corrected in such a manner that the friction coefficient μch becomes equal to the friction coefficient μj determined based on the slip ratio of the wheel 2 with respect to the roller 3. This approximates the running resistance applied to the vehicle 1 by the rollers 3 to the running resistance applied to the vehicle 1 running on the actual ground. Thus, the running resistance applied to the vehicle 1 by the rollers 3 is prevented from becoming different from the running resistance applied to the vehicle 1 running on the actual ground due to the difference between the contact state of each wheel 2 with respect to the roller 3 and the contact state of the wheel 2 with respect to the actual ground. This suppresses the difference between the drive force produced by the vehicle 1 in the running test and the drive force generated by the vehicle 1 running on the actual ground. Further, inaccuracy of the result of the running test caused by such difference in the drive force is suppressed.

The electronic control unit 7 functions as a running resistance calculating section, a running resistance applying section, and a correcting section.

With reference to the control block diagram of FIG. 6, a procedure executed by the electronic control unit 7 to apply torque corresponding to the running resistance N to the rollers 3 in the running test of the vehicle 1 will now be explained schematically. In the diagram, the reference numerals 21, 22, 23, 24, and 25 represent functions of the electronic control unit 7. The functions are provided for each of the load motors 6.

Figure 6:
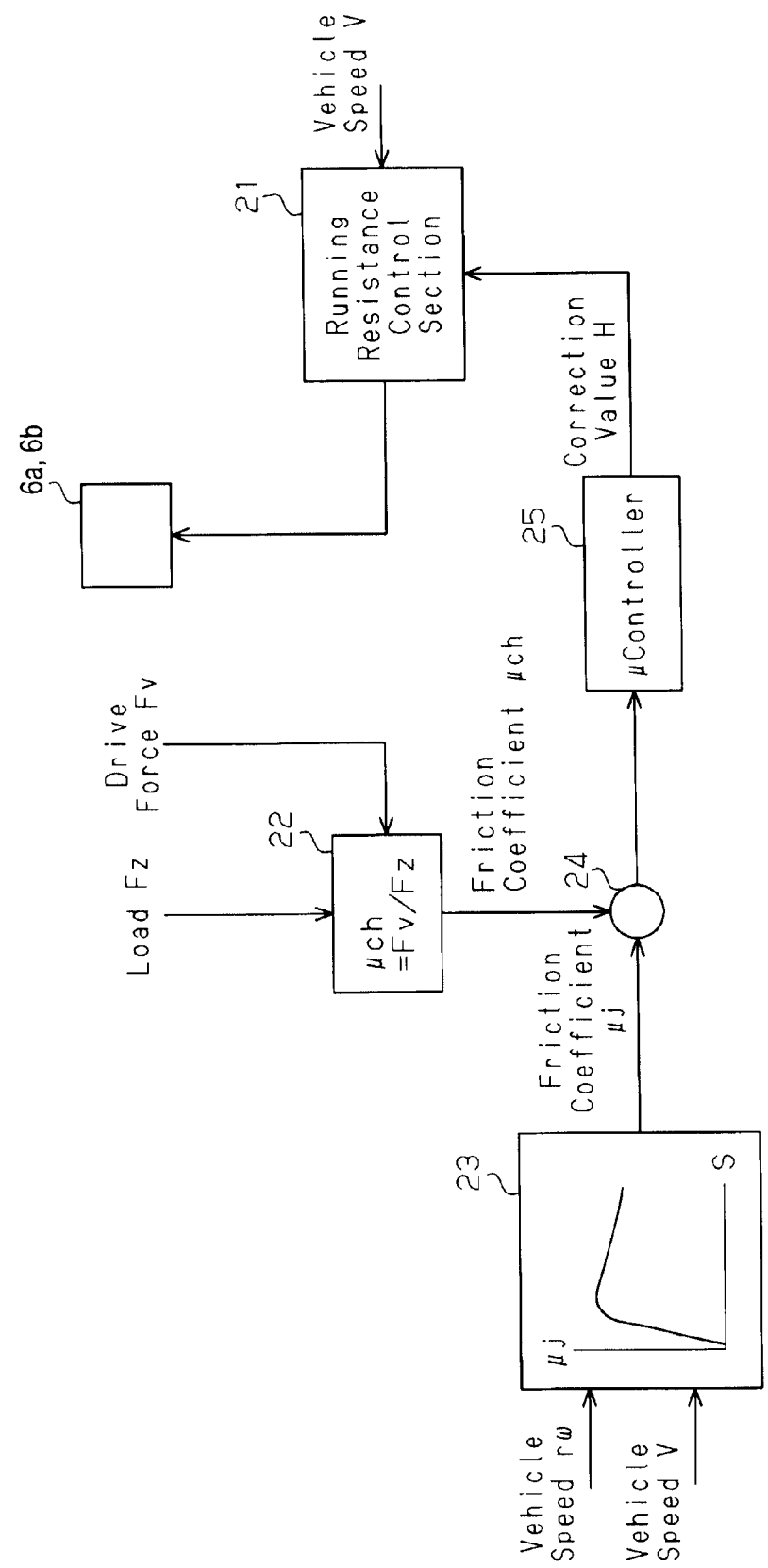
FIG. 6 is a block diagram representing a control procedure performed through an electronic control unit to apply the torque corresponding to the running resistance acting on the vehicle running on the actual ground to the roller in a running test of the vehicle.

As illustrated in FIG. 6, a running resistance control section 21 receives the vehicle speed V and the correction value H and calculates the running resistance N as a value corresponding to running resistance applied to the vehicle 1 when the vehicle 1 runs on the actual ground. The running resistance control section 21 drives the load motors 6 in such a manner that the torque corresponding to the running resistance N acts on the rollers 3. The running resistance N is calculated using the following expression (1).

$$N=f(V)+H \tag{1}$$

In the expression (1), the running resistance base value f(V) represents the theoretical running resistance acting on the vehicle 1 under a prescribed running condition. The running resistance base value f(V) is calculated based on the vehicle speed V of the vehicle 1 on the rollers 3, which is determined using detection signals of the roller speed sensors 11. The correction value H is used in correction of the running resistance in such a manner that the actual friction coefficient μch between each wheel 2 and the corresponding roller 3 approximates the friction coefficient μj between the wheel 2 and the surface of the actual ground. The correction value H is calculated through functions of a friction coefficient calculating section 22, an S-μj characteristics output section 23, a comparator 24, and a μ controller 25. Accordingly, the running resistance N determined by the expression (1) is a value corrected by the correction value H.

Functions of the friction coefficient calculating section 22, the S-μj characteristics output section 23, the comparator 24, and the μ controller 25 will hereafter be listed.

The friction coefficient calculating section 22 receives the load Fz detected by the load sensors 8 and the drive force Fv detected by the drive force sensors 10, and calculates the actual friction coefficient μch between each wheel 2 and the corresponding roller 3 using the following expression (2).

$$\mu ch=Fv/Fz \tag{2}$$

The S-μj characteristics output section 23 receives the vehicle speed rω detected based on detection signals of the wheel speed sensors 9 and the vehicle speed V determined based on detection signals of the roller speed sensors 11. The vehicle speed rω is the theoretical vehicle speed determined on the assumption that the wheels 2 are prevented from skidding. The vehicle speed V represents the vehicle speed V of the vehicle 1 on the rollers 3. The S-μj characteristics output section 23 calculates the slip ratio S of each wheel 2 with respect to the corresponding roller 3 using the following expression (3).

$$S=(r\omega-V)/V \tag{3}$$

The S-μj characteristics output section 23 calculates the actual ground friction coefficient μj based on the slip ratio S, using the map or the model expression that defines the relationship between the slip ratio of each wheel 2 with respect to the ground surface when the vehicle 1 runs on the actual ground and the friction coefficient μj between the wheel 2 and the ground surface.

The comparator 24 receives a signal corresponding to the friction coefficient μch from the friction coefficient calculating section 22 and a signal corresponding to the friction coefficient μj from the S-μj characteristics output section 23. The comparator 24 outputs a signal corresponding to the deviation "μch−μj" between the friction coefficient μch and the friction coefficient μj to the μ controller 25.

Based on the signal corresponding to the deviation "μch−μj", the μ controller 25 calculates the correction value H through proportional integral calculation based on the deviation "μch−μj". The μ controller 25 then outputs a signal corresponding to the correction value H to the running resistance control section 21.

Calculation of the correction value H based on the deviation "μch−μj" by the μ controller 25 will hereafter be explained in further detail. Such calculation uses the following expression (4).

$$H=K1\cdot(\mu ch-\mu j)+K2\cdot\int(\mu ch-\mu j)dt \tag{4}$$

In the expression (4), the term "K1·(μch−μj)" is a proportional term and selectively increases and decreases based on the deviation between the friction coefficient μj and the friction coefficient μch so that these friction coefficients μj and μch coincide with each other. The coefficient K1 of the proportional term "K1·(μch−μj)" is used to convert the parameter "μch−μj" into the parameter that is the running resistance. As the proportional term "K1·(μch−μj)" based on the deviation "μch−μj" selectively increases and decreases, the running resistance N that has been corrected by the correction value H changes. The torque corresponding to the running resistance N is thus applied to the rollers 3. In this manner, the slip ratio S is changed so that the friction coefficient μj determined based on the slip ratio S and the friction coefficient μch obtained based on the drive force Fv and the load Fz approximate each other.

In the expression (4), the term "K2·∫(μch−μj)dt" is an integral term and obtained by accumulating the deviation "μch−μj" in such a manner as to eliminate the remnant deviation between the friction coefficients μch and μj, which cannot be removed only by the proportional term "K1·(μch−μj)". To obtain the integral term "K2·∫(μch−μj)" in each cycle, the deviation between the friction coefficients μj and μch is added to such deviation from the previous cycle and then the added value is multiplied by the coefficient K2. As the integral term "K2·∫(μch−μj)" based on accumulation of the deviation "μch−μj" selectively increases and decreases, the running resistance N that has been corrected by the correction term H changes and torque corresponding to the running resistance N is applied to the rollers 3. In this manner, the slip ratio S is changed in such a manner as to eliminate the remnant deviation between the friction coefficient μj based on the slip ratio S and the friction coefficient μch based on the drive force Fv and the load Fz, that is, the remnant deviation that cannot be removed only by the proportional term "K1·(μch−μj)".

Figure 7:
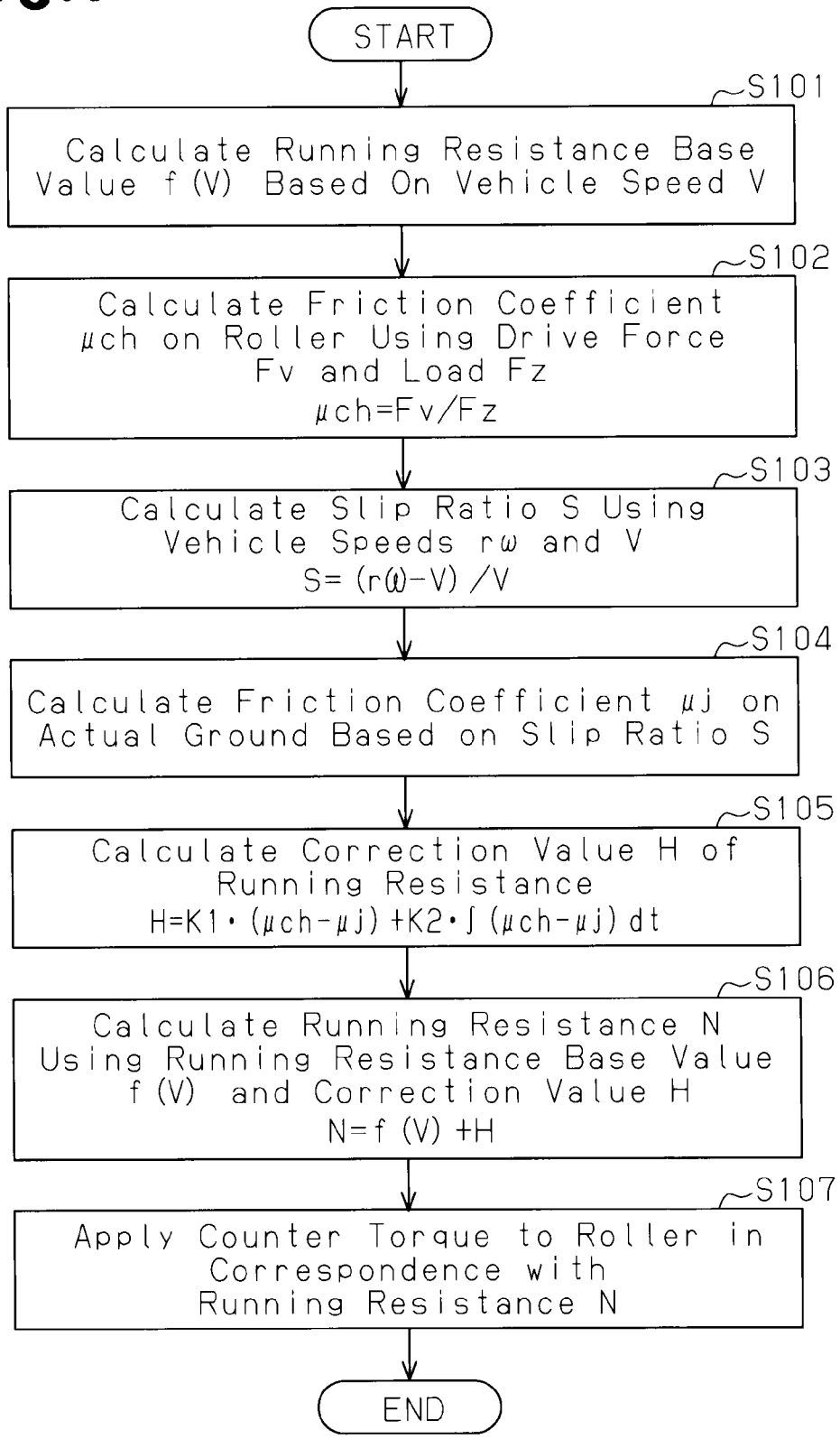
FIG. 7 is a flowchart representing a procedure by which the torque corresponding to the running resistance applied to the vehicle running on the actual ground is applied to the roller in the running test of the vehicle.

A procedure for applying torque to the rollers 3 of the vehicle 1 in correspondence with the running resistance of the vehicle 1 running on the actual ground in a running test will now be explained in detail with reference to the flowchart of FIG. 7.

When the running test is performed on the vehicle 1, the torque corresponding to the running resistance N calculated using the aforementioned expression (1) is applied to the rollers 3. As is clear from the expression (1), the running resistance N is a value that has been corrected by the correction value H.

In the expression (1), the running resistance base value f(V) is determined based on the vehicle speed V of the vehicle 1 running on the rollers 3, which is obtained from detection signals of the roller speed sensors 11, in step S101. As the vehicle speed V increases, the running resistance base value f(V) increases.

Calculation of the correction value H using the expression (1) is performed through the procedure from step S102 to step S105.

In this series of procedure, first in step S102, the actual friction coefficient μch between each wheel 2 and the corresponding roller 3 is calculated using the expression (2). Subsequently, in step S103, the slip ratio S of the wheel 2 with respect to the roller 3 is determined by the expression (3). Then, in step S104, the friction coefficient μj on the actual ground is obtained based on the slip ratio S with reference to the map or the model expression. Further, in step S105, the correction value H is calculated based on the friction coefficient μch and the friction coefficient μj using the expression (4).

Next, in step S106, the running resistance N is determined based on the running resistance base value f(V) and the correction value H using the expression (1). Finally, in step S107, each load motor 6 is actuated in such a manner as to apply torque corresponding to the obtained running resistance N to the corresponding roller 3.

If the running test is carried out on a four-wheel-drive vehicle, the aforementioned control is performed on both the rollers 3 corresponding to the front drive wheels and the rollers 3 corresponding to the rear drive wheels. If a two-wheel-drive vehicle is subjected to the running test using the test device of FIG. 1, the control is performed on the rollers 3 corresponding to the drive wheels with the rollers 3 corresponding to the other wheels rotated at the speed equal to the speed at which the rollers 3 corresponding to the drive wheels rotate. Alternatively, even if the test is performed on the two-wheel-drive vehicle, the control may be carried out on the rollers 3 corresponding to the drive wheels and the rollers 3 corresponding to the other wheels.

The present embodiment has the following advantages.

(1) In the running test using the vehicle running test device, the running resistance N is corrected by the correction value H in such a manner that the actual friction coefficient μch between each wheel 2 and the corresponding roller 3 and the friction coefficient μj determined based on the slip ratio of the wheel 2 with respect to the roller 3 become equal to each other. The running resistance applied to the vehicle 1 by the rollers 3 when the torque corresponding to the corrected running resistance N acts on the rollers 3 approximates the running resistance applied to the vehicle 1 when the vehicle 1 runs on the actual ground. This suppresses difference between the drive force generated by the vehicle 1 in the running test and the drive force produced by the vehicle 1 running on the actual ground. Further, the result of the running test is prevented from becoming inaccurate due to such difference in the drive force.

(2) In the running test using the vehicle running test device, the actual friction coefficient μch between each wheel 2 and the corresponding roller 3 is calculated based on the drive force Fv produced by the vehicle 1, which is actually measured by each drive force sensor 10, and the load Fz applied to the roller 3 by the wheel 2, which is actually measured by the load sensor 8, using the expression (2). This ensures accurate calculation of the friction coefficient μch, regardless of various factors of the test environment including the ambient temperature, the humidity, the radius of curvature of the outer circumference of each roller 3, and the load Fz applied to the roller 3 by the wheel 2. Accordingly, by correcting the running resistance N by the correction value H in such a manner that the actual friction coefficient μch and the friction coefficient μj determined based on the slip ratio S of the wheel 2 with respect to the roller 3 become equal to each other, the running resistance applied to the vehicle 1 by the rollers 3 is further effectively approximated to the running resistance applied to the vehicle 1 when the vehicle 1 runs on the actual ground.

(3) When displacement of the vehicle 1 from the rollers 3 is restricted by the chains 4 before the running test by the vehicle running test device is started, the tensile force of each chain 4 acting on the vehicle 1 is adjusted by means of the corresponding adjustment device 5 while monitoring the load Fz applied to each wheel 2 by the corresponding roller 3, which is detected by the associated load sensor 8. The tensile force of the chain 4 with respect to the vehicle 1 is thus adjusted to such a value that the load Fz is not influenced by the tensile force. That is, by preventing the tensile force of each chain 4 from influencing the load fz, the load Fz is prevented from influencing the running resistance applied to the vehicle 1 by the corresponding roller 3. As a result, accuracy of the result of the test result is ensured.

The illustrated embodiment may be modified in, for example, the following forms.

Each adjustment device 5 may be controlled by the electronic control unit 7 in such a manner that the tensile force of each chain 4 is automatically adjusted through the adjustment device 5 at the start of the running test.

Each load sensor 8 may be replaced by a tensile force sensor that detects the tensile force of the corresponding one of the chains 4. In this case, to restrict displacement of the vehicle 1 from the rollers 3 using the chains 4, the tensile force of each chain 4 applied to the vehicle 1 is adjusted while monitoring the tensile force detected by the tensile force sensor. In this manner, such tensile force is adjusted to such a value that the tensile force does not influence the load applied to the corresponding roller 3 by the wheel 2. This ensures an advantage equivalent to the item (3).

Figure 8:
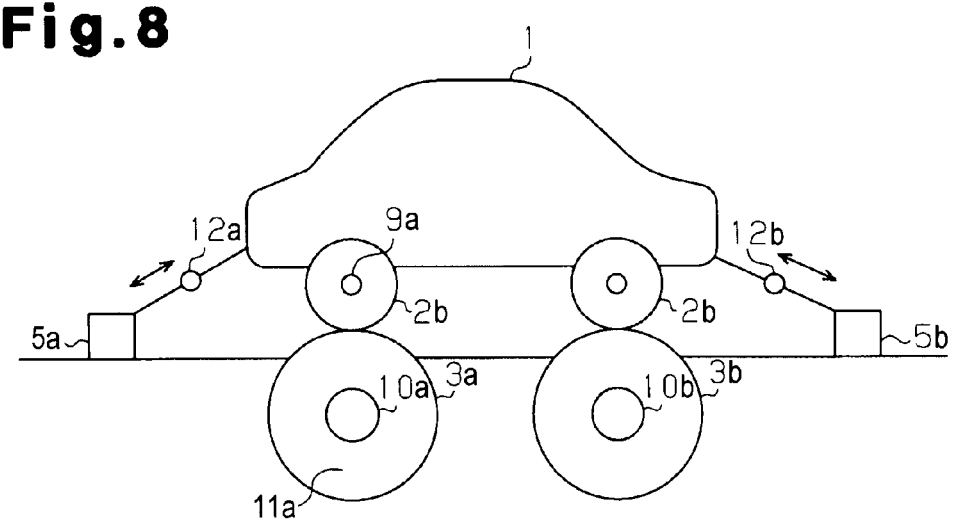
FIG. 8 is a diagram showing another example of restriction of displacement of the vehicle from the rollers.

As shown in FIG. 8, each adjustment device 5, which adjusts the tensile force of the corresponding chain 4, may be arranged to be lower than the vehicle 1 mounted on the rollers 3. Further, each tensile force sensor 12a and 12b (where 12a represents the pair of tensile force sensors in the front and 12b represents the pair of tensile force sensors in the rear), which detects the tensile force of the corresponding chain 4, may be provided on the chain 4. For the sake of simplicity, throughout the specification hereafter, the reference numeral "12" is used to refer to any of the front or rear tensile force sensors of the respective corresponding features associated with the reference numbers (6a) and (6b). This arrangement also ensures the advantage equivalent to the item (3). Alternatively, in this arrangement, each tensile force sensor 12 may be replaced by the load sensor 8 of the above illustrated embodiment.

If the vehicle running test device is a type that rotatably supports the rollers 3 through hydraulic pressure, a hydraulic pressure sensor may be provided to detect the hydraulic pressure that acts to support the rollers 3. In this case, the load Fz applied to each roller 3 by the corresponding wheel 2 may be determined based on a detection signal produced by the hydraulic pressure sensor.

Although the chains 4 are used as restrictors that restrict displacement of the vehicle 1 from the rollers 3, the chains 4 may be replaced by other types of restrictors such as wires.

Figure 9:
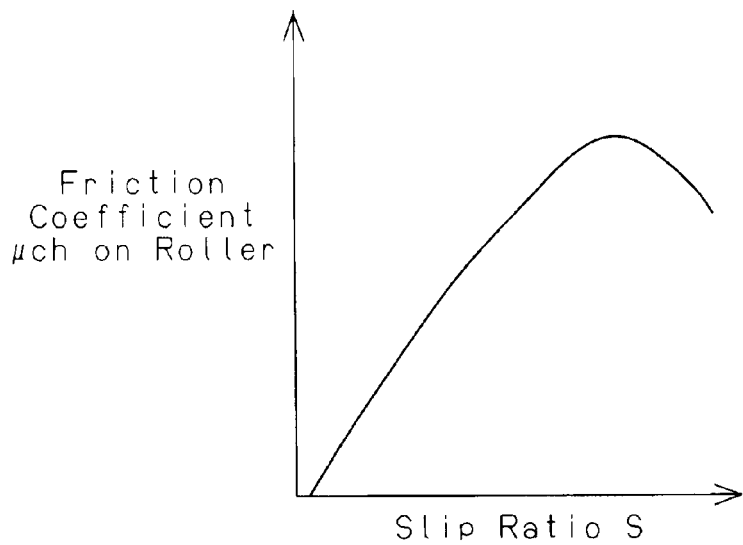
FIG. 9 is a graph representing changes of the friction coefficient with respect to changes of the slip ratio of the wheel on the roller.

Although the friction coefficient μch between each wheel 2 and the corresponding roller 3 is calculated based on the drive force Fv and the load Fz that are actually measured, the present invention is not restricted to this. Specifically, the relationship between the slip ratio S and the friction coefficient μch is illustrated in FIG. 9. The change characteristics of the friction coefficient μch with respect to changes of the slip ratio S may be defined using a map or a model expression. In this case, the slip ratio S is actually measured and the friction coefficient μch is calculated with reference to the map or the model expression. This ensures an advantage equivalent to the item (1).

In the illustrated embodiment, the running resistance N is approximated to the running resistance applied to the vehicle 1 running on the actual ground using the correction value H, which is calculated from the proportional term "K1·(μch−μj)" and the integral term "K2·∫(μch−μj)dt". In other words, PI control is performed. However, the present invention is not restricted to such control. Specifically, the running resistance N may be approximated to the running resistance applied to the vehicle 1 running on the actual ground using the correction value H that is calculated only from the proportional term "$K1 \cdot (\mu ch - \mu j)$", that is, P control may be performed.

The adjustment devices 5, which adjust the tensile forces of the corresponding chains 4, do not necessarily have to be provided. That is, by omitting the adjustment devices 5, the structure of the vehicle running test device may be simplified.

A fixed value determined from the weight of the vehicle 1 may employed as the load Fz.

The invention claimed is:

1. A vehicle running test device comprising:
a roller on which a wheel of a vehicle is mounted, the roller being rotated by rotation of the wheel;
a running resistance calculating section that calculates a running resistance of the vehicle on an actual ground based on a vehicle speed determined based on rotation of the roller and a friction coefficient between the wheel and a ground surface of the actual ground;
a running resistance applying section that applies a torque corresponding to the running resistance to the roller;
a correcting section that calculates a slip ratio of the wheel with respect to the roller, the friction coefficient between the wheel and a ground surface of the actual ground which is based on the slip ratio, and a friction coefficient between the wheel and the roller, the correcting section correcting the running resistance calculated by the running resistance calculating section such that the friction coefficient between the wheel and the roller becomes equal to the friction coefficient between the wheel and the actual ground; and
a first restrictor that restricts displacement of the vehicle from the roller without affecting a load applied to the roller by the wheel.

2. The vehicle running test device according to claim 1, further comprising:
a drive force sensor that detects a drive force transmitted from the wheel to the roller; and
a load sensor that detects the load applied to the roller by the wheel,
wherein the correcting section calculates the friction coefficient between the wheel and the roller by dividing the drive force detected by the drive force sensor by the load detected by the load sensor.

3. The vehicle running test device according to claim 1, wherein the correcting section calculates the slip ratio based on a rotational speed of the wheel and a rotational speed of the roller and calculates the friction coefficient between the wheel and the roller based on the slip ratio using a map or an expression that defines change characteristics of the friction coefficient between the wheel and the roller with respect to changes of the slip ratio.

4. The vehicle running test device according to claim 1, wherein the correcting section calculates a correction value, by which the running resistance is corrected, using a proportional term based on a deviation between the friction coefficient between the wheel and the roller and the friction coefficient between the wheel and the actual ground and an integral term based on the deviation.

5. The vehicle running test device according to claim 1, further comprising:
a load sensor that detects the load applied to the roller by the wheel; and
an adjustment device that adjusts a tensile force of the first restrictor acting on the vehicle.

6. The vehicle running test device according to claim 1, further comprising:
a tensile force sensor that detects a tensile force of the first restrictor applied to the vehicle; and
an adjustment device that adjusts the tensile force of the first restrictor applied to the vehicle.

7. The vehicle running test device according to claim 1, wherein the first restrictor restricts displacement of the vehicle from the roller prior to starting the vehicle running test device.

8. The vehicle running test device according to claim 1, further comprising a second restrictor,
wherein each of the first and second restrictors has a first end thereof fixed to the vehicle and a second end thereof fixed to a structure adjacent to the vehicle.

9. The vehicle running test device according to claim 8, wherein the structure to which the second ends of the first and second restrictors is fixed is disposed above the vehicle.

10. The vehicle running test device according to claim 8, wherein the structure to which the second ends of the first and second restrictors is fixed is disposed lower than the vehicle.

11. The vehicle running test device according to claim 8, wherein the structure to which the second ends of the first and second restrictors are fixed is an adjustment device.

12. The vehicle running test device according to claim 8, wherein the first ends of the first and second restrictors are fixed to opposite ends of the vehicle, respectively.

13. A vehicle running test device comprising:
a roller on which a wheel of a vehicle is mounted, the roller being rotated by rotation of the wheel;
a running resistance calculating section that calculates a running resistance of the vehicle on an actual ground based on a vehicle speed determined based on rotation of the roller and a friction coefficient between the wheel and a ground surface of the actual ground;
a running resistance applying section that applies a torque corresponding to the running resistance to the roller;
a correcting section that calculates a slip ratio of the wheel with respect to the roller, the friction coefficient between the wheel and a ground surface of the actual ground which is based on the slip ratio, and a friction coefficient between the wheel and the roller, the correcting section correcting the running resistance calculated by the running resistance calculating section such that the friction coefficient between the wheel and the roller becomes equal to the friction coefficient between the wheel and the actual ground,
wherein the correcting section calculates the slip ratio based on a rotational speed of the wheel and a rotational speed of the roller and calculates the friction coefficient between the wheel and the roller based on the slip ratio using a map or an expression that defines change characteristics of the friction coefficient between the wheel and the roller with respect to changes of the slip ratio.

* * * * *